(12) United States Patent
Yamada

(10) Patent No.: US 7,126,760 B2
(45) Date of Patent: Oct. 24, 2006

(54) IMAGE STABILIZING ZOOM LENS

(75) Inventor: Katsu Yamada, Matsubara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 37 days.

(21) Appl. No.: 10/527,069

(22) PCT Filed: Sep. 8, 2003

(86) PCT No.: PCT/JP03/11463

§ 371 (c)(1),
(2), (4) Date: Mar. 9, 2005

(87) PCT Pub. No.: WO2004/025348

PCT Pub. Date: Mar. 25, 2004

(65) Prior Publication Data

US 2006/0072200 A1    Apr. 6, 2006

(30) Foreign Application Priority Data

Sep. 10, 2002 (JP) .................. 2002-263796

(51) Int. Cl.
G02B 15/14 (2006.01)
G02B 27/64 (2006.01)

(52) U.S. Cl. .................. 359/683; 359/684; 359/554; 359/557

(58) Field of Classification Search .............. 359/683, 359/684, 686, 554, 557
See application file for complete search history.

(56) References Cited

U.S. PATENT DOCUMENTS 6,124,972 A * 9/2000 Hayakawa et al. ......... 359/557
6,392,816 B1 * 5/2002 Hamano ..................... 359/683
6,999,240 B1 * 2/2006 Yamada et al. ............. 359/683

FOREIGN PATENT DOCUMENTS

| EP | 1 103 834 | 5/2001 |
|----|-----------|--------|
| JP | 7-128619 | 5/1995 |
| JP | 8-29737 | 2/1996 |
| JP | 10-232420 | 9/1998 |
| JP | 2002-107623 | 4/2002 |
| JP | 2002-169087 | 6/2002 |

* cited by examiner

Primary Examiner—Scott J. Sugarman
Assistant Examiner—M. Hasan
(74) Attorney, Agent, or Firm—Hamre, Schumann, Mueller & Larson, P.C.

(57) ABSTRACT

A zoom lens includes, a first lens unit (1) having a positive refractive power and is fixed with respect to an image plane; a second lens unit (2) having a negative refractive power and causing a variable power action when moved along an optical axis; an aperture stop (6) fixed with respect to the image plane; a third lens unit (3) having a positive refractive power and fixed with respect to the optical axis direction when zooming and when focusing; a fourth lens unit (4) having a negative refractive power and fixed with respect to the image plane; and a fifth lens unit (5) having a positive refractive power and moveable along the optical axis such that the image plane, which is displaced by a movement of the second lens unit along the optical axis and by a movement of the object, is maintained at a constant position from a reference plane. The entire third lens unit is moveable in a direction perpendicular to the optical axis. A condition, $0.035<|\beta w \cdot \beta t/Z|<0.075$, is satisfied, where $\beta w$: magnification ratio of the second lens unit at the wide-angle end; $\beta t$: magnification ratio of the second lens unit at the telephoto end; and $Z$: zoom ratio.

12 Claims, 17 Drawing Sheets

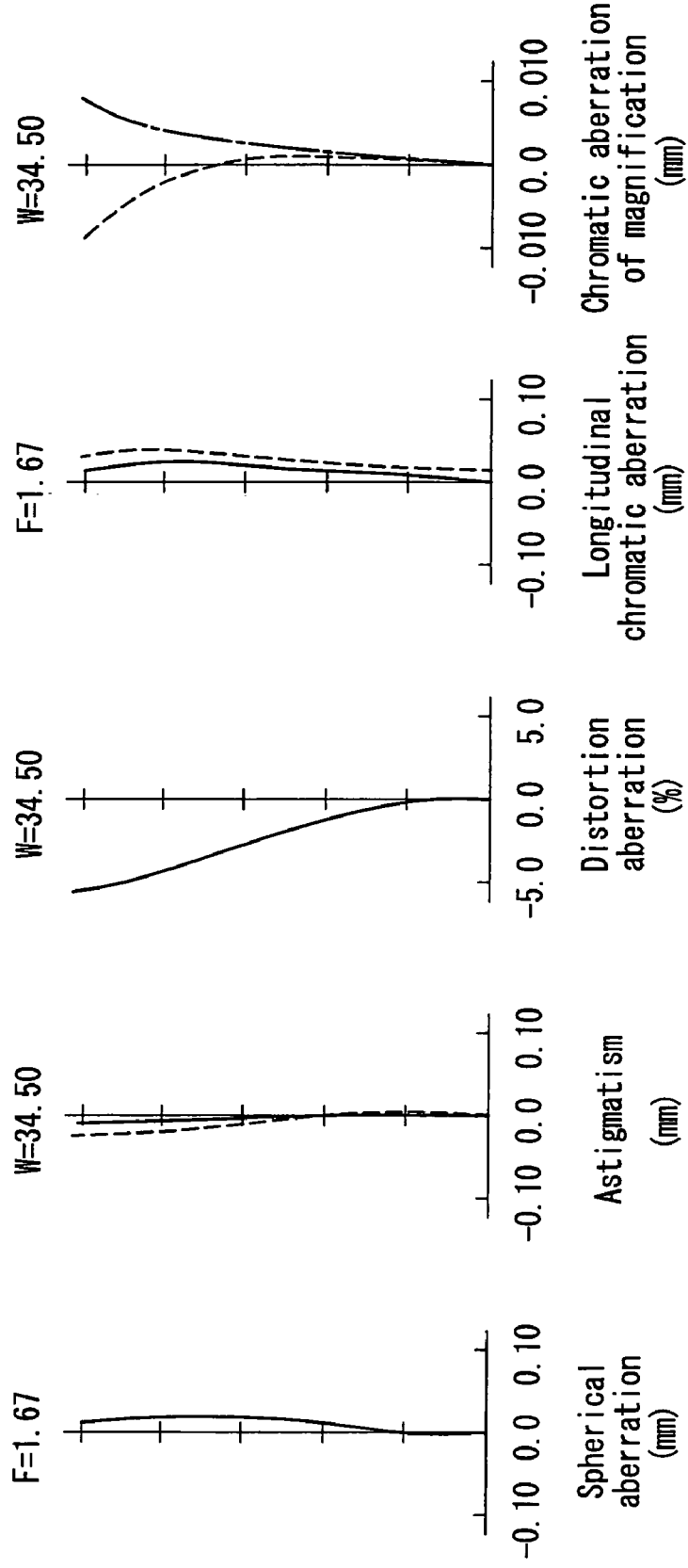

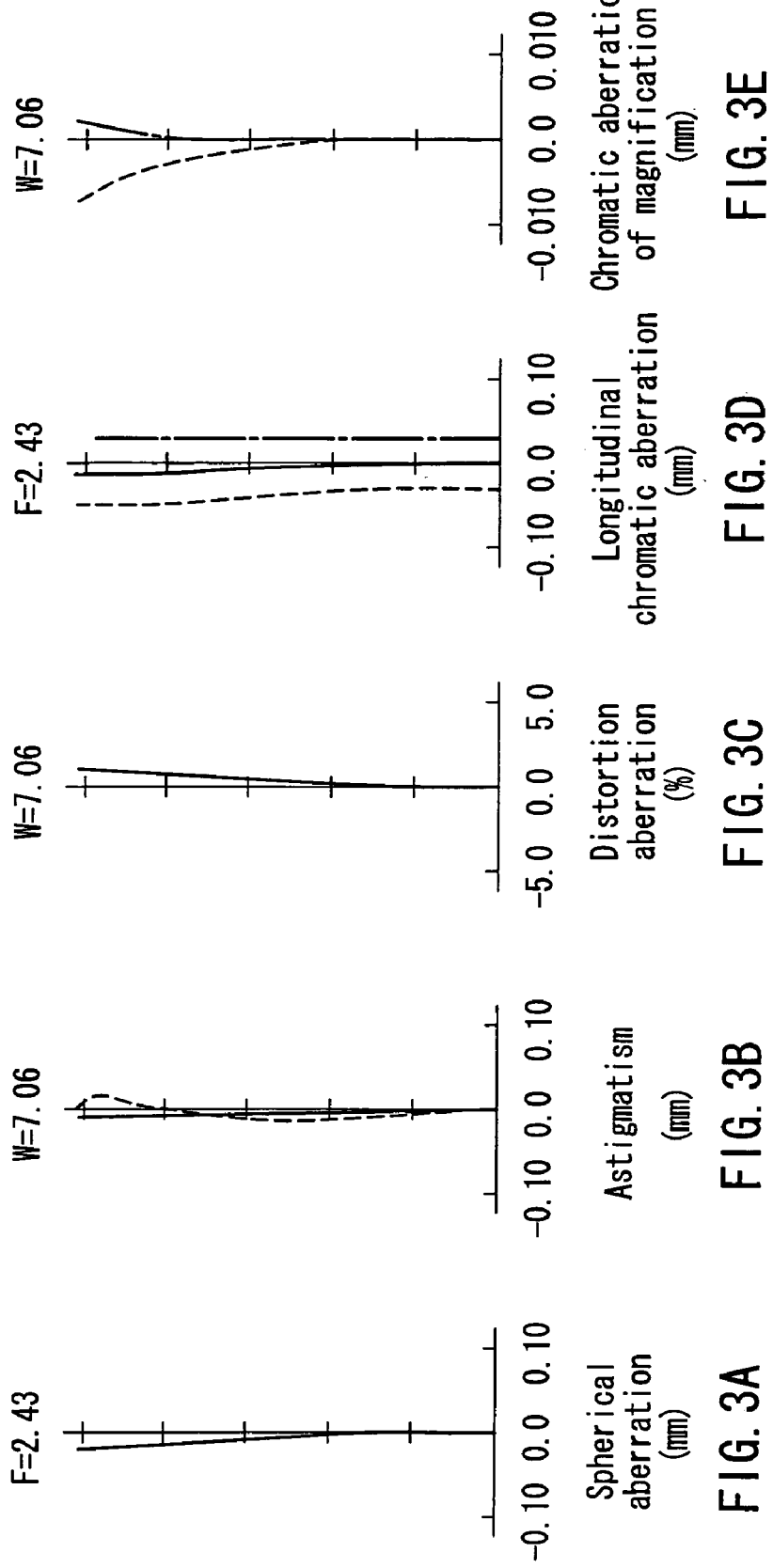

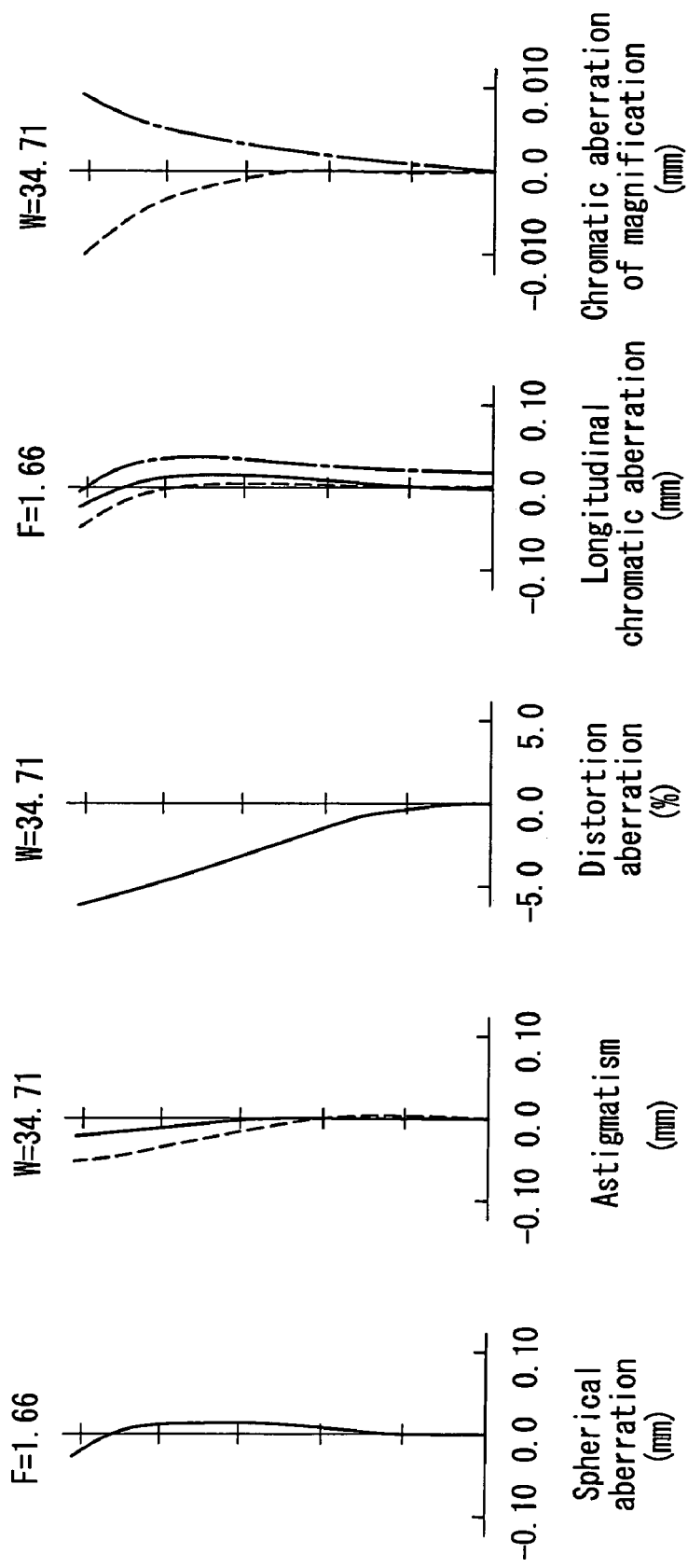

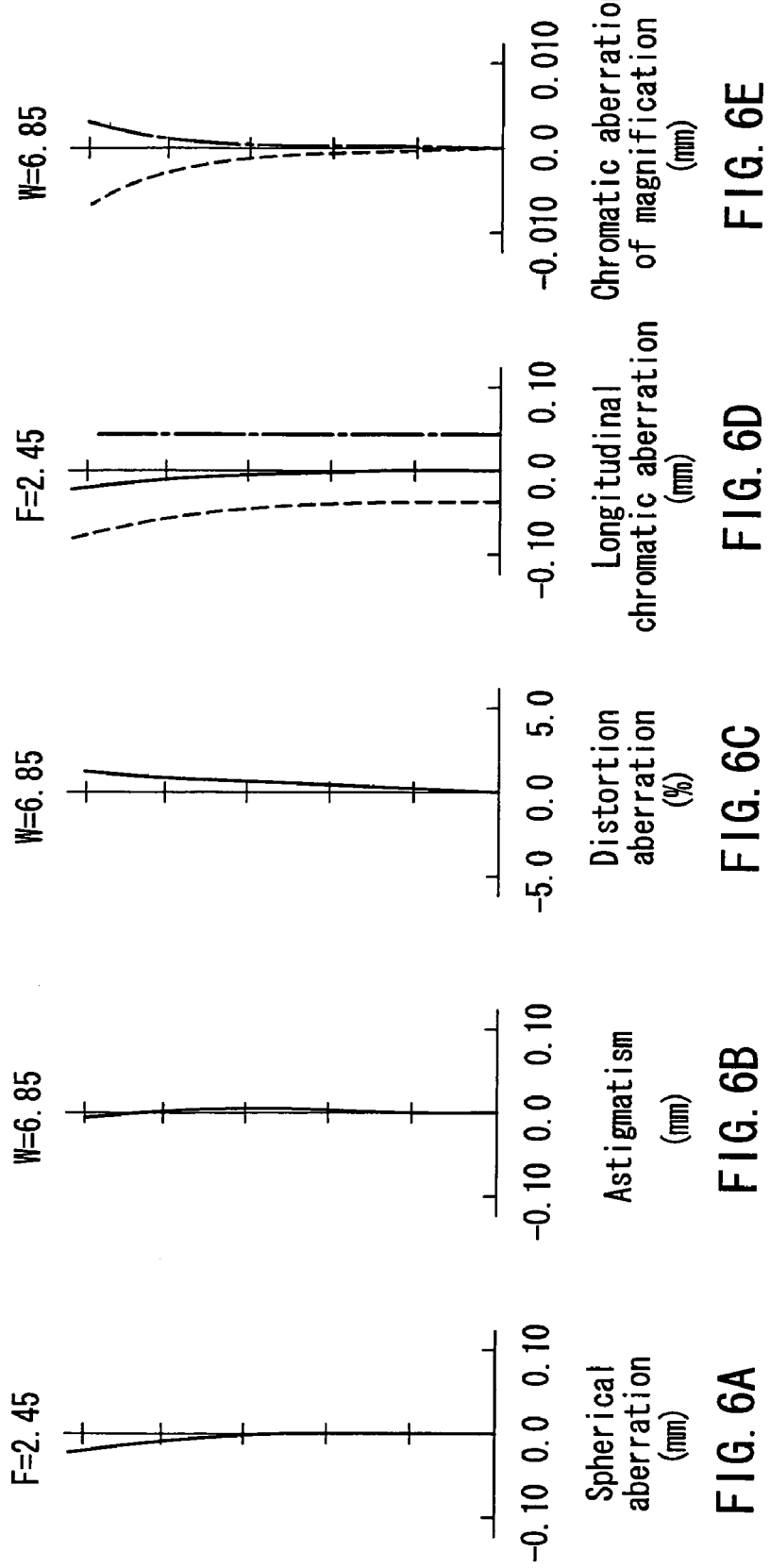

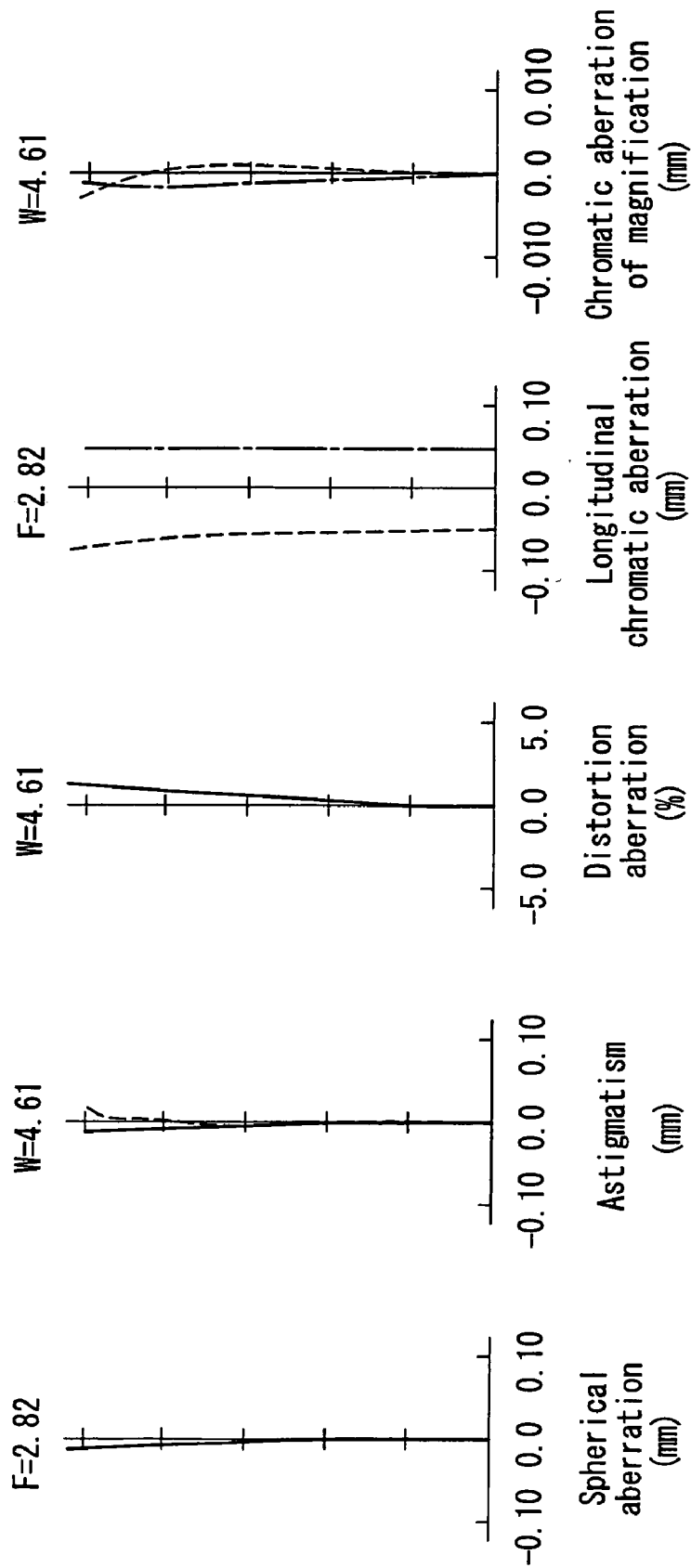

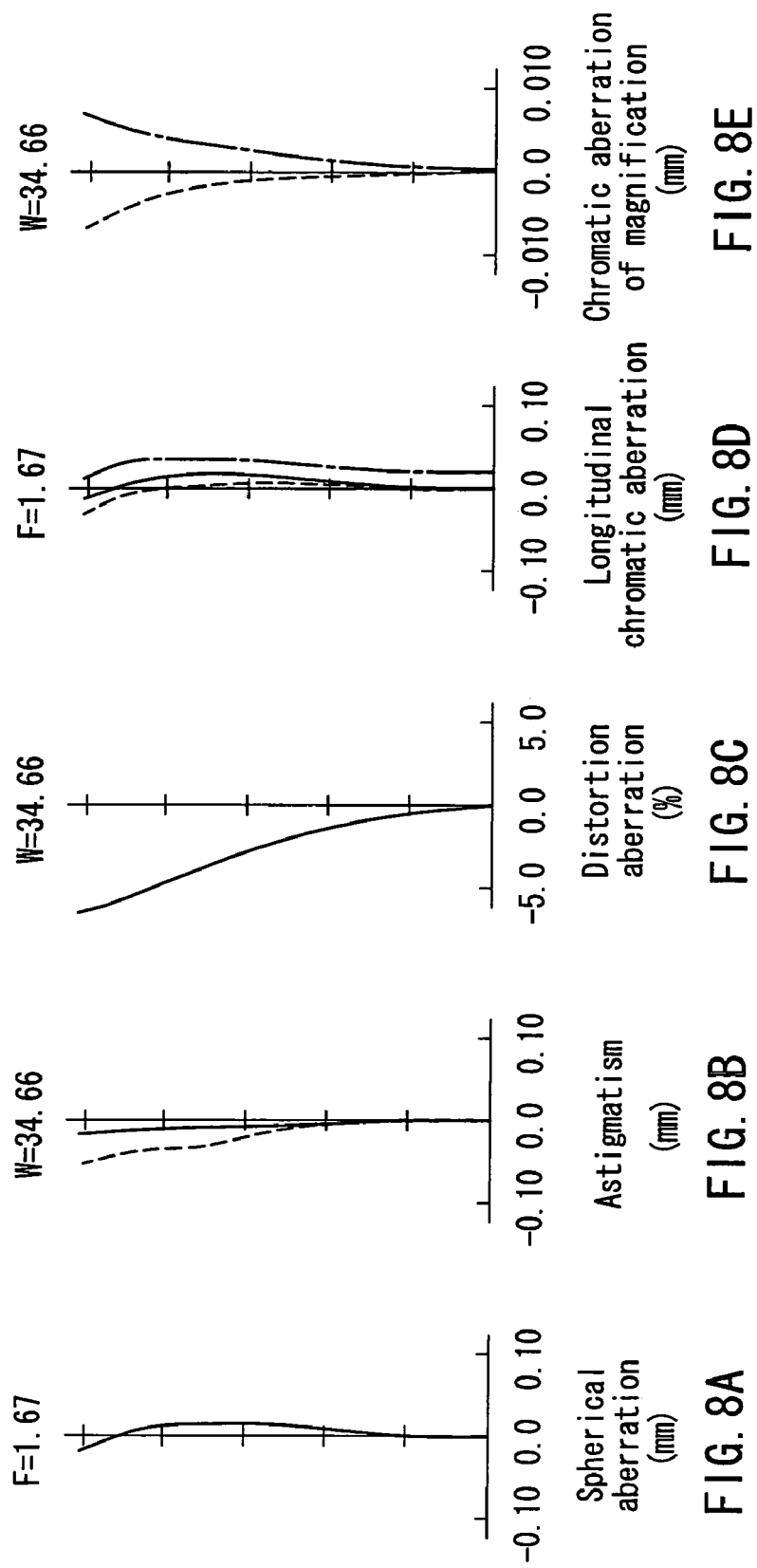

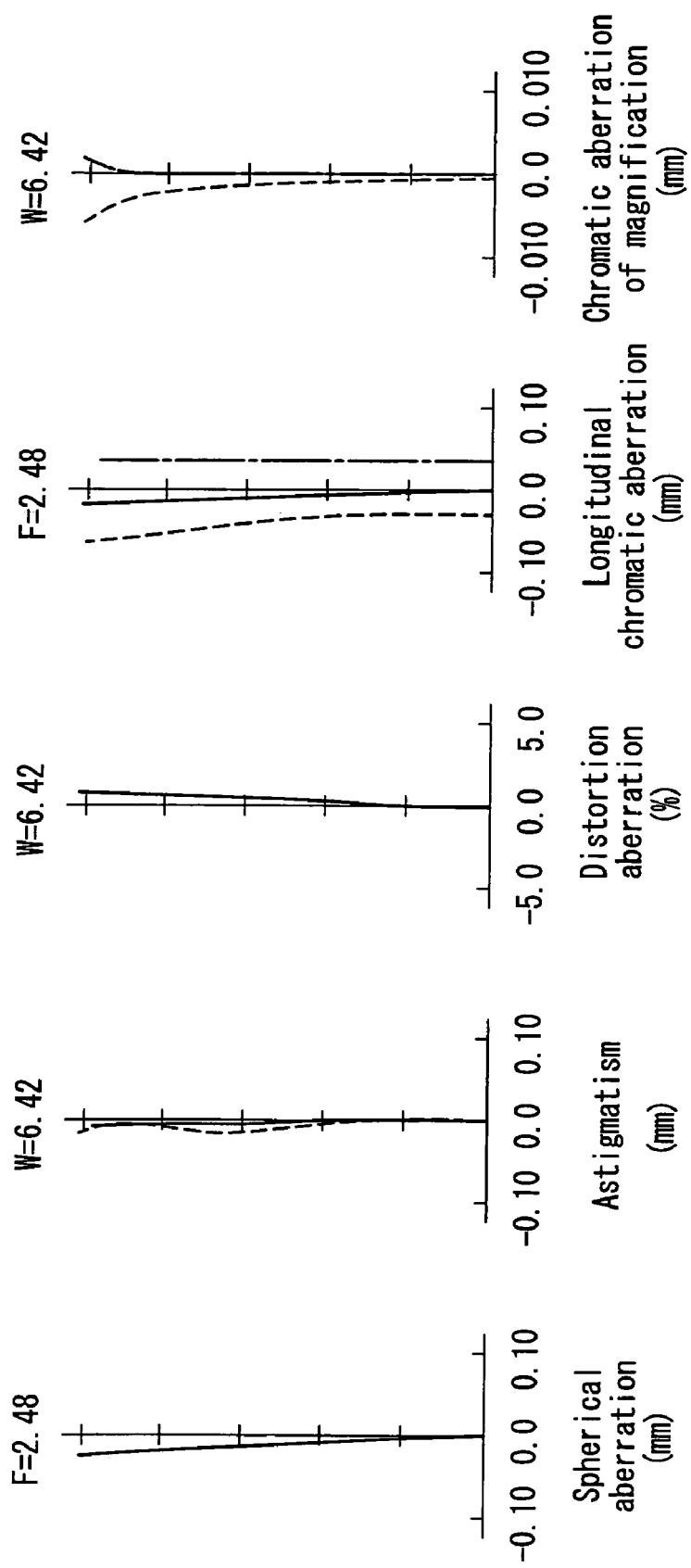

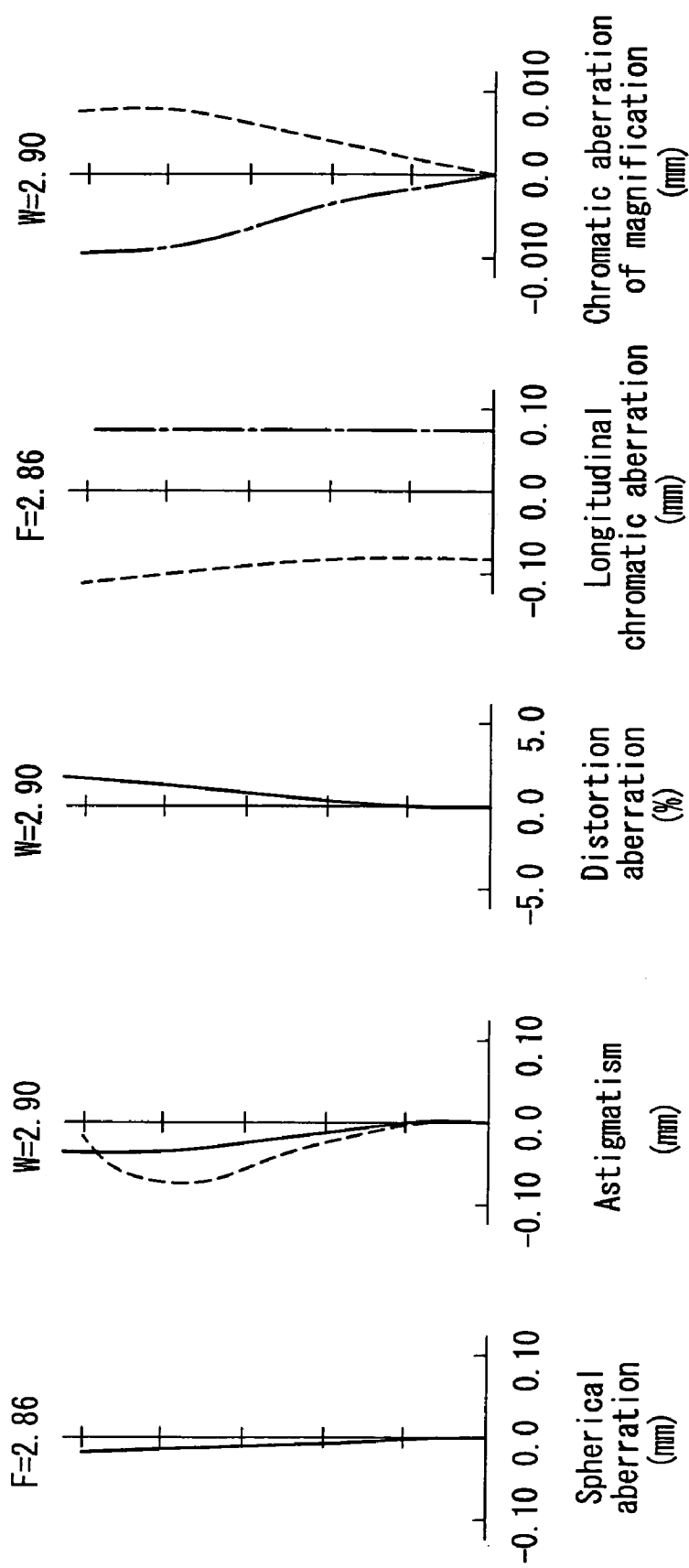

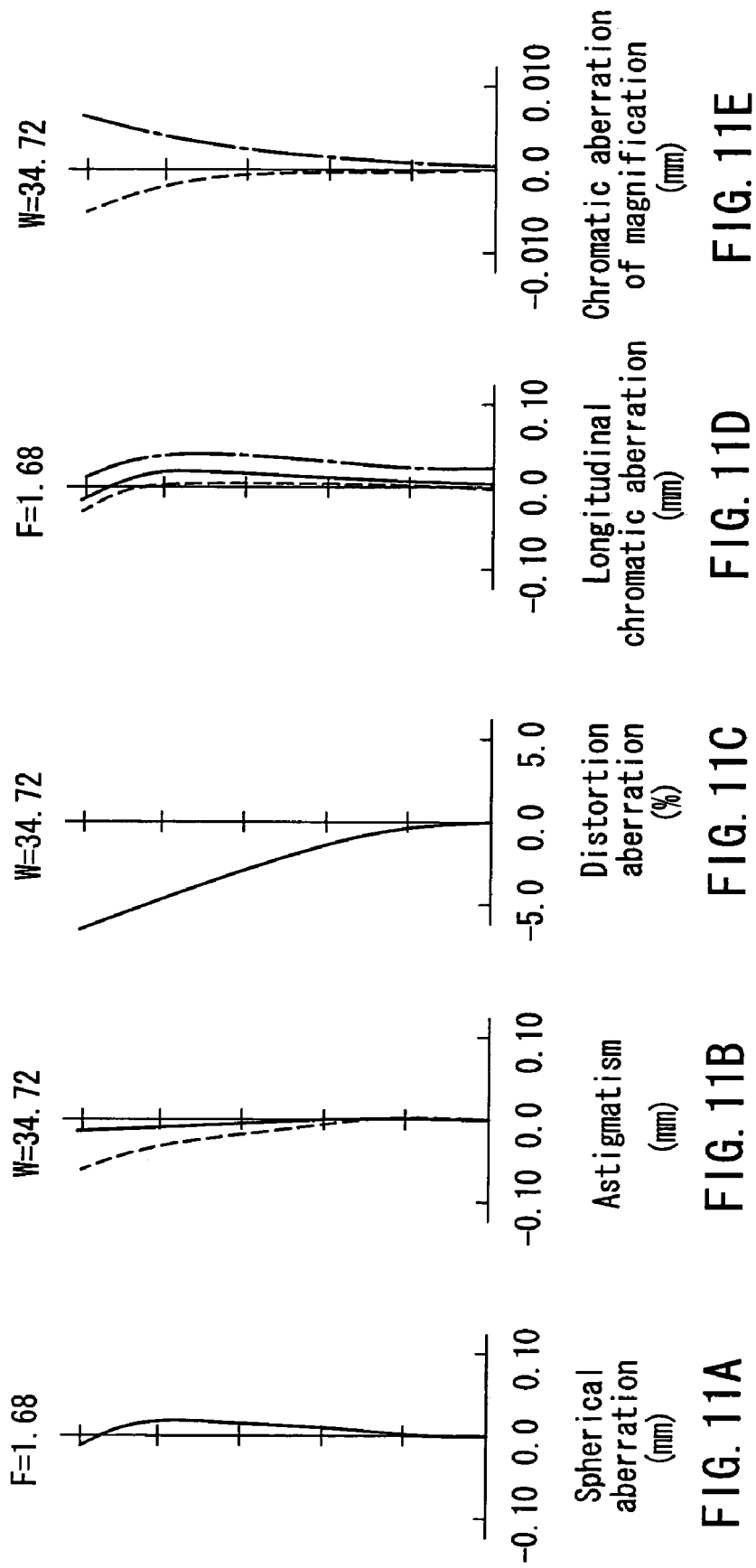

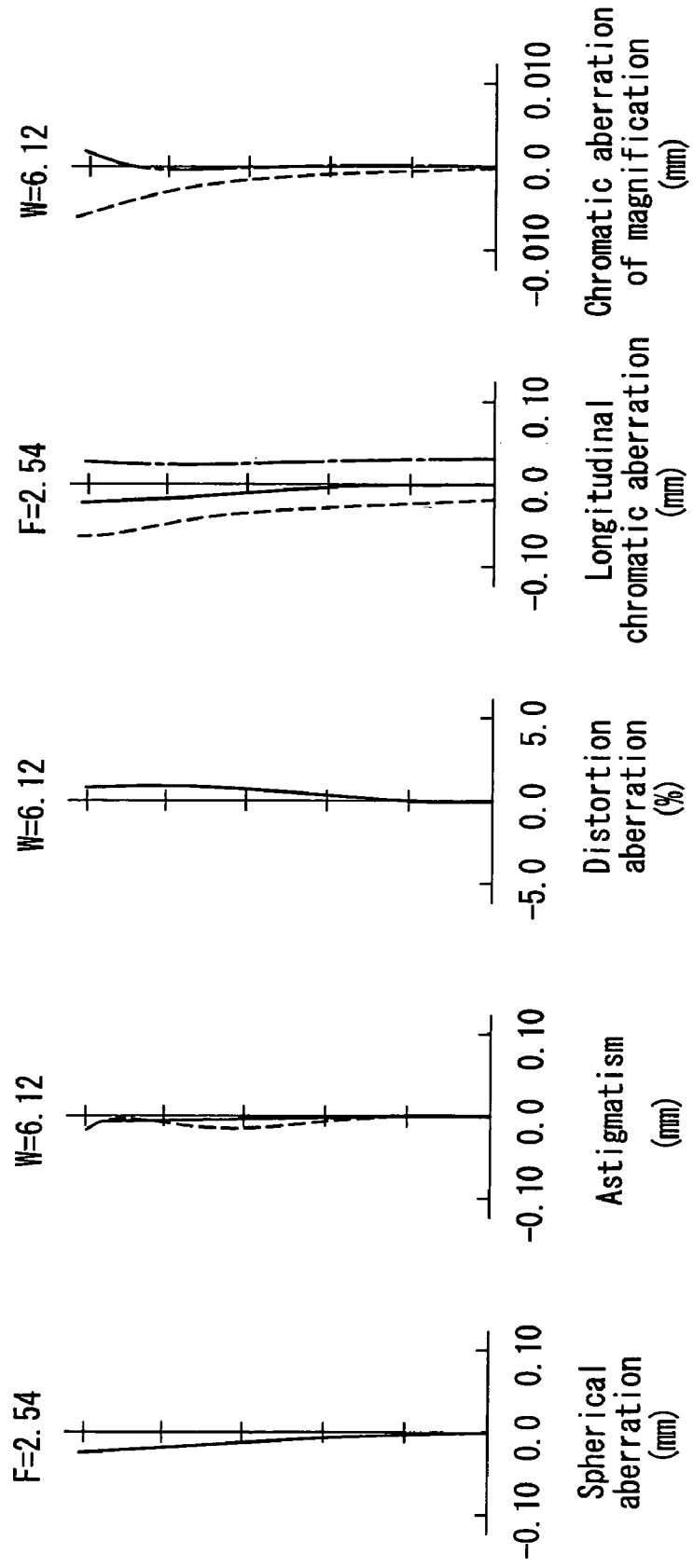

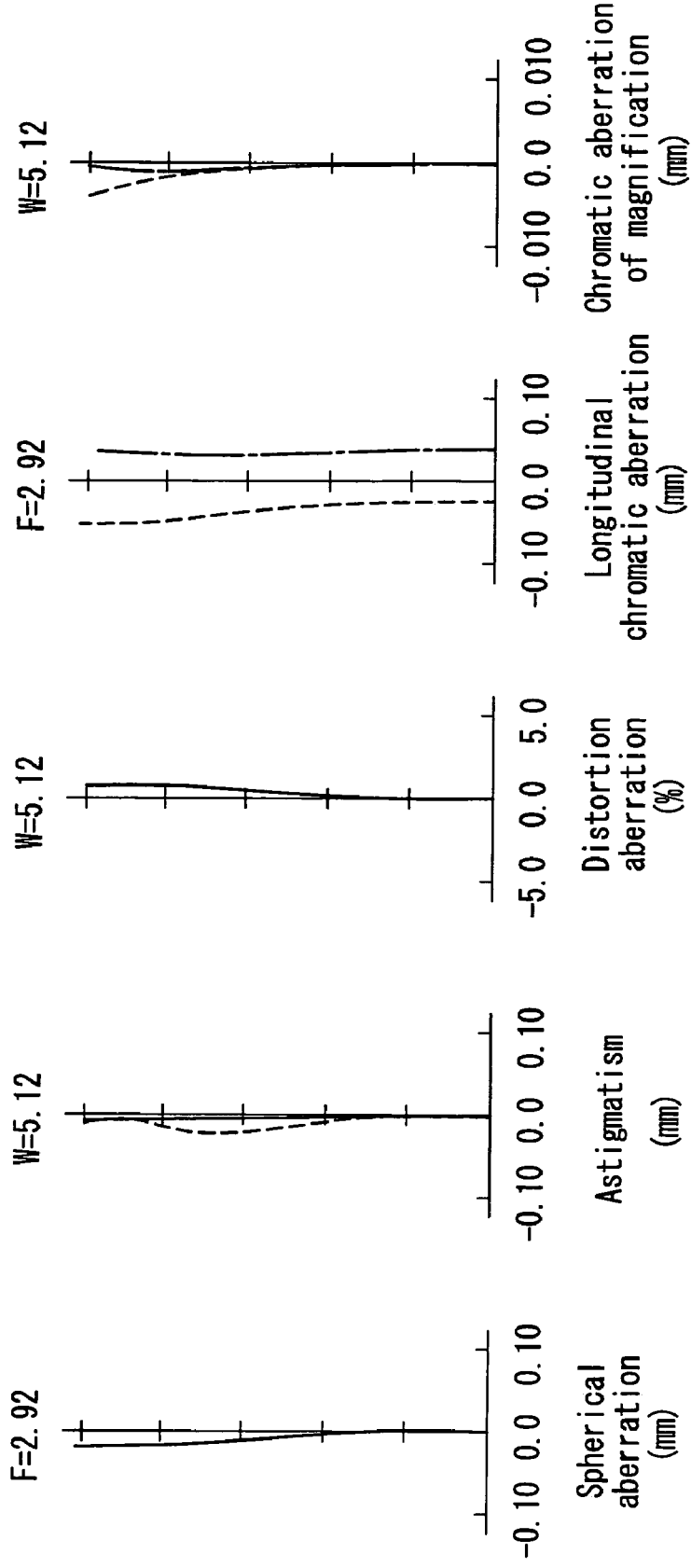

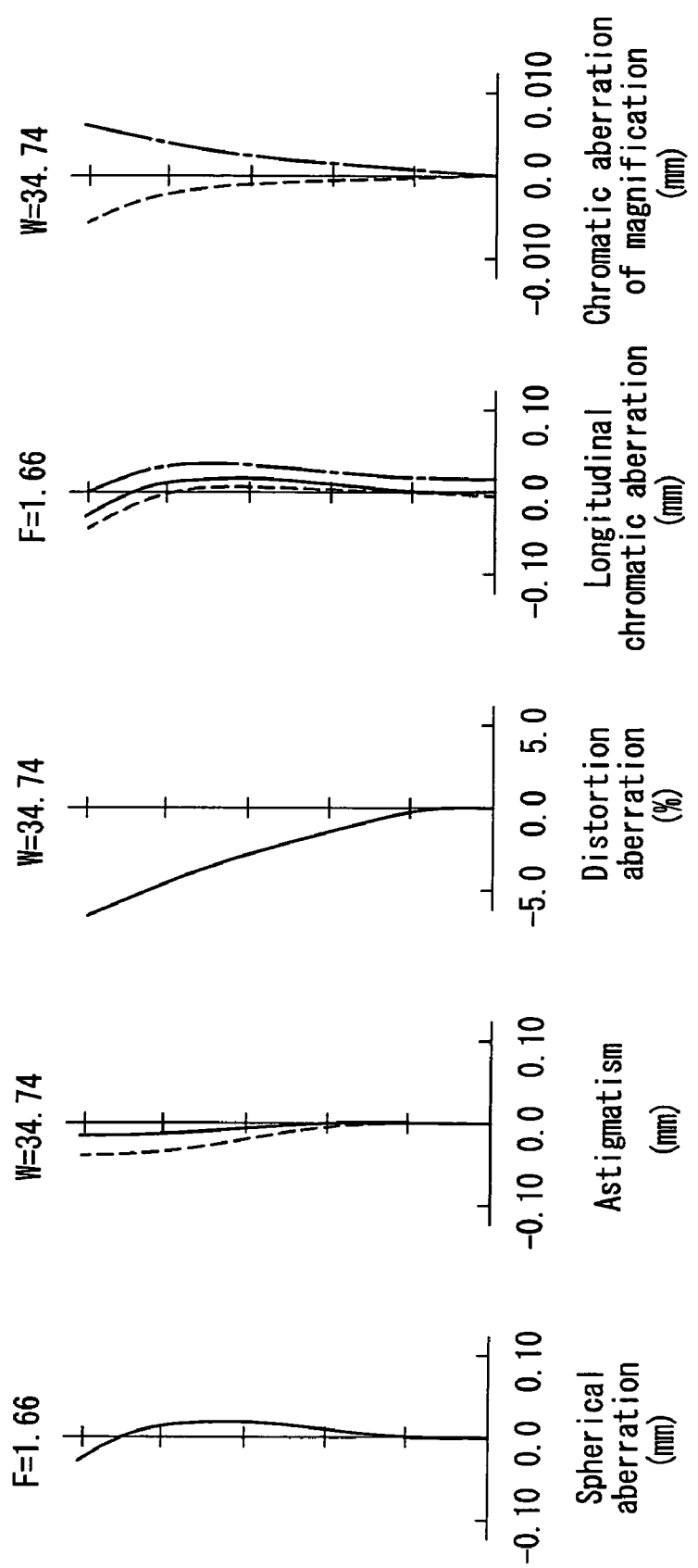

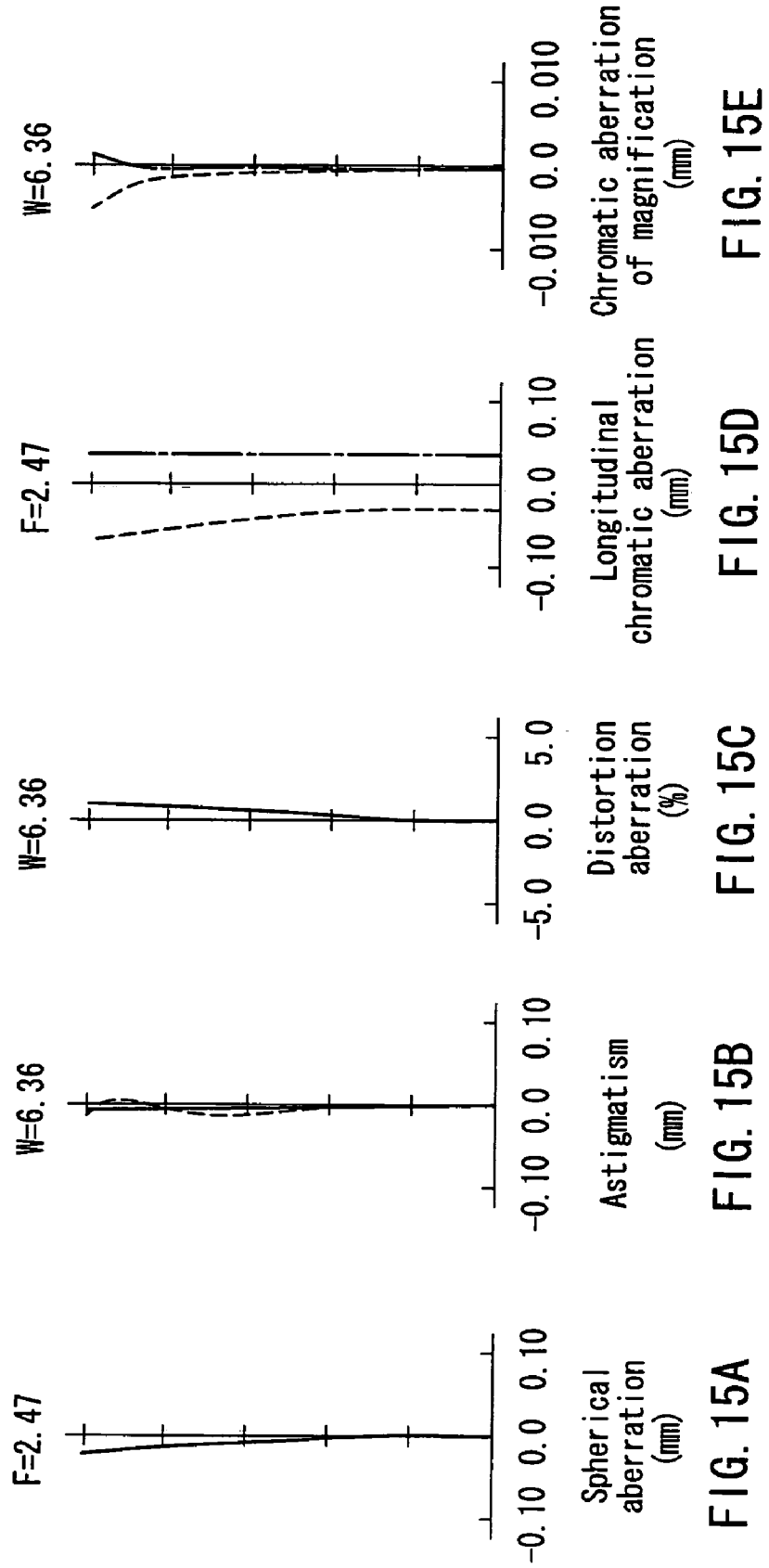

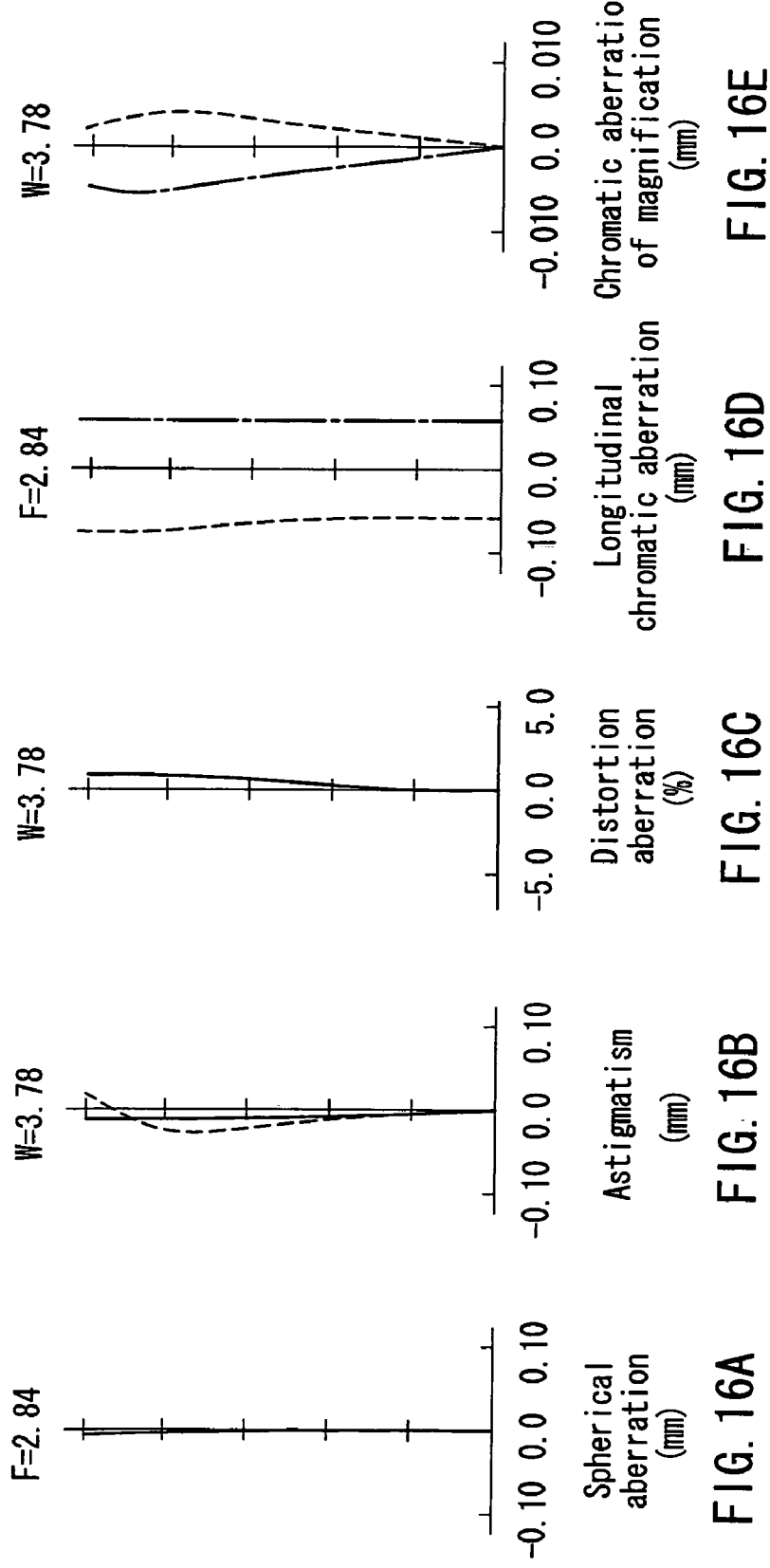

IMAGE STABILIZING ZOOM LENS

TECHNICAL FIELD

The present invention relates to a high-magnification-ratio, high-image-quality zoom lens used in a video camera or the like and having a function for optically stabilizing image shake that occurs due to vibration of a hand or the like.

BACKGROUND ART

Conventionally, an image stabilizing function against image shake due to hand movement or the like has become indispensable in image pickup systems such as video cameras, and various types of image stabilizing optical systems have been proposed.

For example, as disclosed in JP H08-29737A, a type is known in which an optical system for image stabilization configured by two lenses is mounted in front of a zoom lens and stabilizes image shake by moving one of these lenses perpendicularly with respect to the optical axis.

Moreover, as disclosed in JP H07-128619A, a type is known in which, in a zoom lens made of four lens units, image shake due to hand movement is stabilized by moving a part of the third lens unit constituted by a plurality of lenses perpendicularly with respect to the optical axis.

However, in the type disclosed in JP H08-29737A, the optical system for image stabilization is mounted in front of the zoom lens, so that the lens diameter of the optical system for image stabilization becomes large. Moreover, the overall device becomes accordingly large, thus increasing the load on the driving system. For this reason, it was disadvantageous with regard to miniaturization, lighter weight and energy saving.

In the type disclosed in JP H07-128619A, in order to stabilize an image against image shake, a part of the three units fixed with respect to the image plane is perpendicularly movable with respect to the optical axis, so that it is advantageous with regard to size compared to the type in which the optical system for image stabilization is mounted in front of the zoom lens. However, the lens unit for image stabilization is made of three lenses, so that the load on the actuator is large, and also the zoom ratio is smaller than a factor of about ×10.

DISCLOSURE OF THE INVENTION

It is an object of the present invention to provide a zoom lens with five lens units with which the zoom ratio can be made sufficiently large with a compact lens unit for image stabilization, and which is capable of correction of aberrations that is sufficient for practical purposes.

A zoom lens according to the present invention includes, in the following order from an object side: a first lens unit that has a positive refractive power as a whole and that is fixed with respect to an image plane; a second lens unit that has a negative refractive power as a whole and that causes a variable power action when moved along an optical axis; an aperture stop that is fixed with respect to the image plane; a third lens unit that has a positive refractive power as a whole and that is fixed with respect to the optical axis direction when zooming and when focusing; a fourth lens unit that has a negative refractive power as a whole and that is fixed with respect to the image plane; and a fifth lens unit that has a positive refractive power as a whole and that is movable along the optical axis such that the image plane, which is displaced by a movement of the second lens unit along the optical axis and by a movement of the object, is maintained at a constant position from a reference plane. The entire third lens unit is movable in a direction perpendicular to the optical axis in order to stabilize an image. The following condition is satisfied $$0.035 < |\beta_w \cdot \beta_t / Z| < 0.075 \tag{1}$$

$\beta_w$: magnification ratio of the second lens unit at the wide-angle end
$\beta_t$: magnification ratio of the second lens unit at the telephoto end
$Z$: zoom ratio.

BRIEF DESCRIPTION OF THE DRAWINGS

FIGS. 2A to 2E show aberration charts for the wide-angle end of the zoom lens according to Example 1.

FIGS. 3A to 3E show aberration charts for the standard position of the zoom lens according to Example 1.

FIGS. 5A to 5E show aberration charts for the wide-angle end of the zoom lens according to Example 2.

FIGS. 6A to 6E show aberration charts for the standard position of the zoom lens according to Example 2.

FIGS. 7A to 7E show aberration charts for the telephoto end of the zoom lens according to Example 2.

FIGS. 8A to 8E show aberration charts for the wide-angle end of the zoom lens according to Example 3.

FIGS. 9A to 9E show aberration charts for the standard position of the zoom lens according to Example 3.

FIGS. 10A to 10E show aberration charts for the telephoto end of the zoom lens according to Example 3.

FIGS. 11A to 11E show aberration charts for the wide-angle end of the zoom lens according to Example 4.

FIGS. 12A to 12E show aberration charts for the standard position of the zoom lens according to Example 4.

FIGS. 13A to 13E show aberration charts for the telephoto end of the zoom lens according to Example 4.

FIGS. 14A to 14E show aberration charts for the wide-angle end of the zoom lens according to Example 5.

FIGS. 15A to 15E show aberration charts for the standard position of the zoom lens according to Example 5.

FIGS. 16A to 16E show aberration charts for the telephoto end of the zoom lens according to Example 5.

BEST MODE FOR CARRYING OUT THE INVENTION

Figure 1:
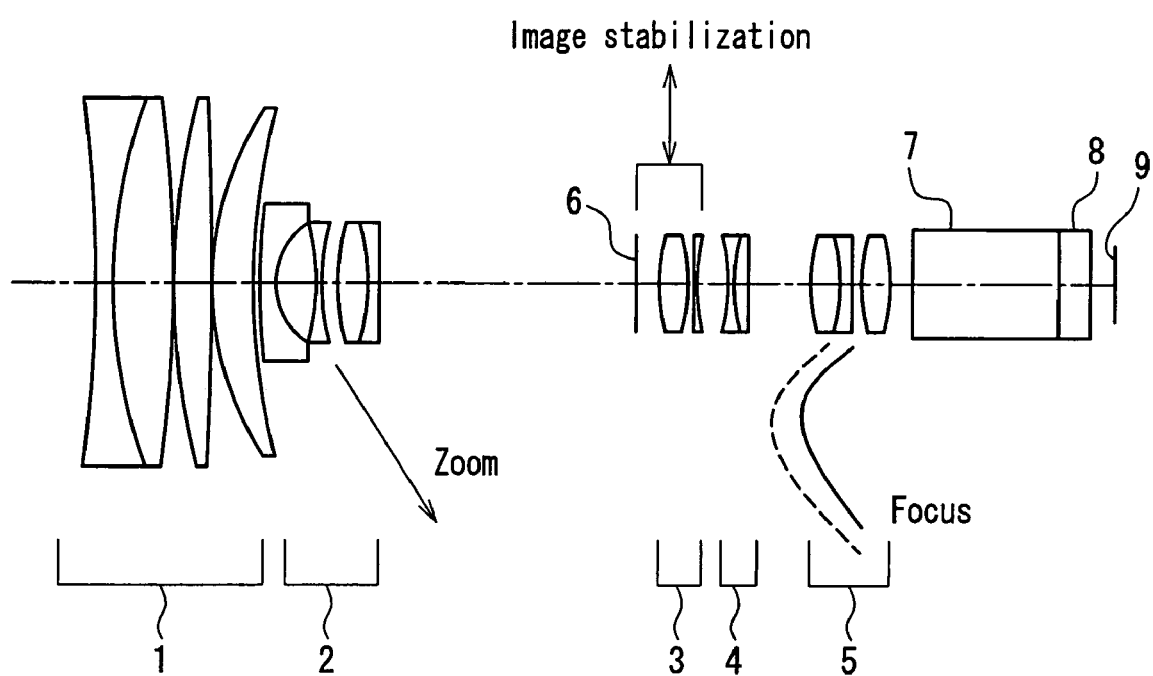
FIG. 1 is a side view showing the lens configuration of an image stabilizing zoom lens according to an embodiment of the present invention.

With a zoom lens according to the present invention having the above configuration, the third lens unit is made movable in order to stabilize an image, so that the zoom lens is compact and the load on the actuator is small, and no problems occur when making the zoom ratio sufficiently large. Furthermore, by satisfying the conditional expression (1), it is possible favorably to correct aberrations over the entire zoom region. Below the lower limit, the overall lens system becomes large, while it is possible to correct aberrations favorably. Above the upper limit, the magnification ratio to be applied becomes large, so that particularly for high-magnification zoom lenses with a large field angle, image deterioration due to aberration becomes considerable, while the lens system can be made small.

In the zoom lens of the present invention, it is preferable that the fifth lens unit is moved to the object side as the object point approaches, and the following condition is satisfied.

$$0 < (d45T - d45N)/(IM \cdot Z) < 0.04 \quad (2)$$

d45T: interval between the fourth lens unit and the fifth lens unit in a telephoto position d45N: interval between the fourth lens unit and the fifth lens unit when the second lens unit is in an equal magnification position IM: image size Z: zoom ratio.

Expression (2) is a condition for attaining a favorable performance in a telephoto position. Below the lower limit, it becomes difficult to attain a large zoom ratio. Above the upper limit, the magnification ratio on the telephoto side becomes large, so that the aberration performance tends to deteriorate, and since the amount by which the fourth lens unit is moved as the object point changes becomes large, the responsiveness during manual focus, for example, becomes poor.

It is further preferable that the fourth lens unit satisfies the following condition when the second lens unit is at an equal magnification position or at the telephoto end.

$$Mt < 1.1 \quad (3)$$

Mt: amount by which the fourth lens unit is moved when the second lens unit is moved by 0.1 mm in a telephoto position.

Expression (3) is a condition for carrying out manual focusing. Above the upper limit, the movement of the fourth lens unit becomes too large, so that the fourth lens unit becomes unable to track during manual focusing.

It is further preferable that the second lens unit satisfies the following condition.

$$0.4 < |\beta t / \sqrt{Z}| < 0.9 \quad (4).$$

Expression (4) is a condition for attaining high performance on the telephoto side. Below the lower limit, it is not possible to attain a high magnification ratio, while it is possible to correct favorably the aberration performance on the telephoto side. Above the upper limit, the magnification ratio becomes too large, so that the aberrations cannot be corrected favorably.

It is further preferable that the first lens unit is made of four lenses including, arranged in order from an object side, a lens with negative refractive power, a lens with positive refractive power, a lens with positive refractive power, and a lens with positive refractive power. Thus, even when the field angle is large, the angle of the light rays at the lens surfaces in the first lens unit can be made small, so that astigmatism and distortion aberration can be corrected favorably.

It is also preferable that an incidence angle and an exit angle of the lens closest to the object side satisfy the following condition.

$$1.7 < \omega 1 o / \omega 1 p < 2.2 \quad (5)$$

ω1o: incidence angle on the lens closest to the object side

ω1p: exit angle from the lens closest to the object side.

Below the lower limit of the expression (5), the barrel distortion becomes large, and the chromatic aberration of magnification becomes corrected insufficiently, whereas above the upper limit, the pincushion distortion becomes large, and the chromatic aberration of magnification becomes overcorrected.

It is also preferable that the curvature radii of the object side surfaces and the image side surfaces of the first lens unit satisfy the following condition.

$$-0.1 < ri1/ri2 < 0.45 \quad (6)$$

ri1: radius of curvature of the object side surface of the i-th single lens of the first lens unit counting from the object side ri2: radius of curvature of the image side surface of the i-th single lens of the first lens unit counting from the object side.

Below the lower limit of the expression (6), the refractive power of the object-side surface becomes large, so that astigmatism becomes overcorrected. Above the upper limit, astigmatism becomes corrected insufficiently.

It is also preferable that the second lens unit comprises at least three concave lenses and one convex lens. Thus, aberration changes during zooming can be suppressed.

It is also preferable that the third lens unit comprises at least one convex lens and one concave lens, and that the fourth lens unit comprises at least one convex lens and one concave lens. Thus, chromatic aberration occurring during the image stabilization can be suppressed.

It is also preferable that the fifth lens unit comprises at least two convex lenses and at least one concave lens. Thus, fluctuations in the aberrations, in particular in the coma aberration, during the focusing can be suppressed.

It is also preferable that the second, the third and the fourth lens unit comprise at least one aspherical surface. The aspherical surface of the second lens unit can correct favorably coma aberration at the wide-angle region, the aspherical surface of the third lens unit can correct spherical aberration favorably as well as astigmatism and coma aberration occurring during the image stabilization, and the aspherical surface of the fourth lens unit can correct favorably fluctuations in the aberrations during focusing.

It is also preferable that the second to fifth lens units comprise at least one lens having the same sag amount on both sides, more preferably comprise at least one aspherical surface whose sag amount on both sides is the same, and more preferably all of the aspherical surfaces are such that the sag amount on both sides is the same.

It is possible to configure a video camera comprising a zoom lens having any of the above-described configurations and an image-pickup element for photoelectrically converting light that has passed through the zoom lens. Thus, it is possible to attain a video camera that is compact and that has a high-performance function for image stabilization.

The following is a more detailed explanation, with reference to the drawings, of a zoom lens equipped with a function for image stabilization according to an embodiment of the present invention.

FIG. 1 shows the configuration of a zoom lens according to an embodiment of the present invention. This zoom lens includes a first lens unit 1, a second lens unit 2, an aperture stop 6, a third lens unit 3, a fourth lens unit 4, and a fifth lens unit 5, arranged in that order from the object side toward the image plane. Numeral 7 denotes a prism, numeral 8 denotes a quartz or the like, and numeral 9 denotes the image plane. "Quartz or the like 8" means an optical member including a low-pass filter, an infrared filter, or a cover glass of an image-pickup element or the like.

The first lens unit 1 has a positive refractive power as a whole and is fixed with respect to the image plane. The second lens unit 2 has a negative refractive power as a whole and causes a variable power action when moved along the optical axis. The aperture stop 6 is fixed with respect to the image plane. The third lens unit 3 has a positive refractive power as a whole and is fixed with respect to the optical axis direction when zooming and when focusing. The fourth lens unit 4 has a negative refractive power as a whole and is fixed with respect to the image plane. The fifth lens unit 5 has a positive refractive power as a whole, and is movable along the optical axis such that the image plane, which is displaced by a movement of the second lens unit 2 along the optical axis and by a movement of the object, is maintained at a constant position from a reference plane.

The entire third lens unit 3 is moveable in a direction perpendicular to the optical axis. When image shake occurs, a shift of the image is compensated by moving the third lens unit 3 in a direction perpendicular to the optical axis.

In this zoom lens, the following condition is satisfied.

$$0.035 < |\beta w \cdot \beta t / Z| < 0.075 \quad (1)$$

$\beta w$: magnification ratio of the second lens unit at the wide-angle end
$\beta t$: magnification ratio of the second lens unit at the telephoto end
$Z$: zoom ratio.

In the following, numerical values are given for specific Examples of the zoom lens of the present invention. The basic configuration of the lens units in these Examples is the same as shown in FIG. 1. Depending on the Example, the individual lenses may differ from the ones shown in FIG. 1, but this is not particularly shown in the drawings, and the explanations are made in accordance with the configuration of the lens units in FIG. 1.

EXAMPLE 1

Table 1 shows a numerical example of a zoom lens according to Example 1. It should be noted that in Table 1, r denotes the radius of curvature of the lens faces, d denotes the lens thickness or the air interval between the lenses, n denotes the refractive index of the lenses at the d-line, and v denotes the Abbe number of the lenses at the d-line. Moreover, the aspherical coefficients for this example are listed in Table 2.

Here, aspherical surfaces are given by the following equation:

$$SAG = \frac{H^2/R}{1 + \sqrt{1 - (1+K)(H/R)^2}} + D \cdot H^4 + E \cdot H^6 + F \cdot H^8$$

SAG: distance of the point on the aspherical surface from the vertex of the aspherical surface at the height H from the optical axis H: height from the optical axis
R: radius of curvature at the vertex of the aspherical surface
K: conical constant
D, E, F: aspherical coefficients.

Moreover, for the air intervals that are variable by zooming, Table 3 lists values when the object point is at infinity. In Table 3, the standard position is the position at which the magnification ratio of the second unit becomes −1. f, F/No and ω respectively denote the focal length, the F number, and the half angle of view for wide-angle end, standard position and telephoto end of the zoom lens in Table 1. Moreover, d7 represents the interval between the lens unit 1 and the lens unit 2, d14 represents the interval between the lens unit 2 and the aperture stop 6, d22 represents the interval between the lens unit 4 and the lens unit 5, and d27 represents the interval between the lens unit 5 and the prism 7.

TABLE 1

| unit | surface | r | d | n | v |
|---|---|---|---|---|---|
| 1 | 1 | −460.108 | 3.00 | 1.84665 | 23.8 |
|   | 2 | 64.271 | 8.40 | 1.49699 | 81.6 |
|   | 3 | −172.755 | 0.20 |   |   |
|   | 4 | 96.854 | 4.80 | 1.80600 | 40.7 |
|   | 5 | −724.368 | 0.20 |   |   |
|   | 6 | 41.470 | 5.70 | 1.83499 | 42.7 |
|   | 7 | 114.513 | var. |   |   |
| 2 | 8 | 114.513 | 1.00 | 1.83499 | 42.7 |
|   | 9 | 9.510 | 6.00 |   |   |
|   | 10 | −25.541 | 1.35 | 1.60602 | 57.4 |
|   | 11 | 25.541 | 1.35 |   |   |
|   | 12 | 28.161 | 4.00 | 1.84665 | 23.8 |
|   | 13 | −21.343 | 1.00 | 1.83401 | 37.2 |
|   | 14 | ∞ | var. |   |   |
| aperture stop | 15 | — | 2.50 | — | — |
| 3 | 16 | 24.425 | 3.50 | 1.51450 | 63.1 |
|   | 17 | −24.425 | 0.80 |   |   |
|   | 18 | ∞ | 1.00 | 1.80518 | 25.4 |
|   | 19 | 60.000 | 3.50 |   |   |
| 4 | 20 | −23.384 | 1.00 | 1.69680 | 55.6 |
|   | 21 | 23.384 | 1.60 | 1.84665 | 23.8 |
|   | 22 | ∞ | var. |   |   |
| 5 | 23 | 25.658 | 3.50 | 1.49699 | 81.6 |
|   | 24 | −25.658 | 1.00 | 1.84665 | 23.8 |
|   | 25 | 54.731 | 1.00 |   |   |
|   | 26 | 17.728 | 4.50 | 1.60602 | 57.4 |
|   | 27 | −17.728 | var. |   |   |
| 6 | 28 | ∞ | 20.00 | 1.58913 | 61.2 |
|   | 29 | ∞ | 3.00 | 1.51633 | 64.1 |
|   | 30 | ∞ | — |   |   |

TABLE 2

| surface | K | D | E | F |
|---|---|---|---|---|
| 10 | 2.01718E+00 | 4.00028E−05 | 1.19781E−07 | 6.55685E−10 |
| 11 | 2.01718E+00 | −4.00028E−05 | −1.19781E−07 | −6.55685E−10 |
| 16 | −8.71014E−02 | −1.42231E−05 | −1.42761E−08 | 0.00000E+00 |
| 17 | −8.71014E−02 | 1.42231E−05 | 1.42761E−08 | 0.00000E+00 |
| 23 | −1.32903E+00 | −2.69550E−05 | 6.30125E−08 | 0.00000E+00 |
| 24 | −1.32903E+00 | 2.69550E−05 | −6.30125E−08 | 0.00000E+00 |

TABLE 3

|  | wide angle | standard | telephoto |
|---|---|---|---|
| f | 4.627 | 24.027 | 51.524 |
| F/NO | 1.668 | 2.433 | 2.830 |
| 2ω | 69.000 | 14.118 | 6.586 |
| d7 | 1.000 | 27.555 | 34.000 |
| d14 | 35.000 | 8.445 | 2.000 |
| d22 | 12.400 | 9.341 | 11.388 |
| d27 | 2.000 | 5.059 | 3.012 |

A structural diagram of a zoom lens based on the data in Table 1 is similar to that given in FIG. 1. In this zoom lens, which is based on the data in Table 1, the first lens unit 1 has a positive refractive power, and is fixed with respect to the image plane during zooming and focusing. The second lens unit 2 has a negative refractive power, and performs a variable power action by being moved along the optical axis. The third lens unit 3 is configured by a positive lens and a negative lens, and has a positive refractive power as a whole. The fourth lens unit 4, which is made of a negative lens and a positive lens, has a negative refractive power as a whole, and is fixed with respect to the image plane during zooming and focusing. The fifth lens unit 5 has a positive refractive power, and by being moved along the optical axis, it simultaneously performs image movement by zooming and focus adjustment. When image shake occurs, the image stabilization is performed by moving the third lens unit 13 in a direction perpendicular to the optical axis.

Figures 4A, 4B, 4C, 4D, 4E:
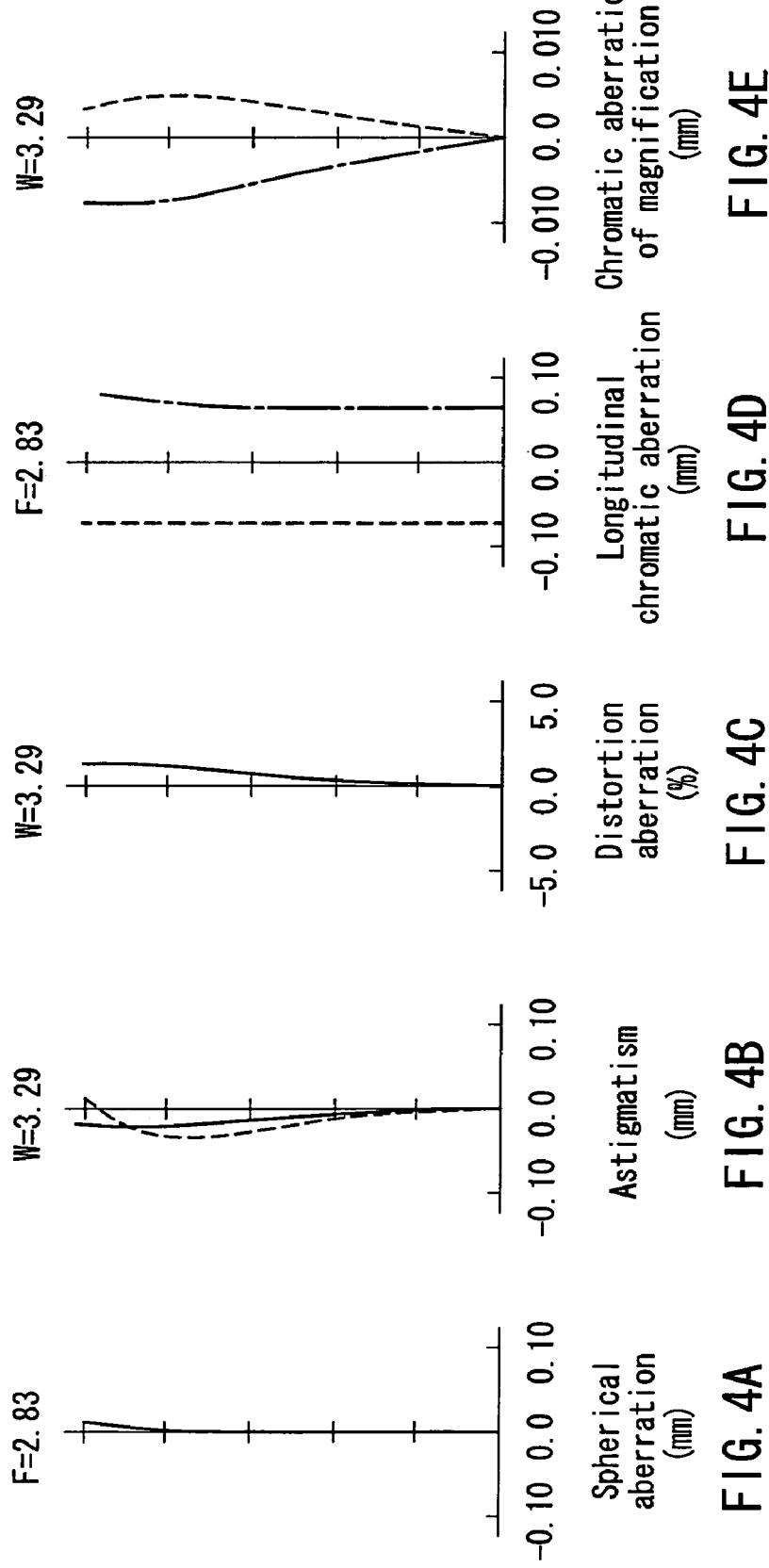
FIGS. 4A to 4E show aberration charts for the telephoto end of the zoom lens according to Example 1.

FIGS. 2A to 2E respectively show aberration charts for the wide-angle end of the zoom lens based on the data in Table 1. FIGS. 3A to 3E show aberration charts for the standard position. FIGS. 4A to 4E show aberration charts for the telephoto end. FIGS. 2A, 3A and 4A are the charts for the spherical aberration and the solid line shows the values with respect to the d-line. FIGS. 2B, 3B and 4B are the charts for the astigmatism and the solid line shows a curvature of the sagittal image surface whereas the broken line shows a curvature of the meridional image surface. FIGS. 2C, 3C and 4C show the distortion aberration. FIGS. 2D, 3D and 4D show the longitudinal chromatic aberration, with the solid line showing the values for the d-line, the broken line showing the values for the F-line and the dash-dotted line showing the values for the C-line. FIGS. 2E, 3E and 4E show the chromatic aberration of magnification, with the broken line showing the values for the F-line and the dash-dotted line showing the values for the C-line. The above explanations of the tables and figures also apply to the following Examples.

The values corresponding to the afore-mentioned conditional expressions (1) to (6) are as follows:

$|\beta w \cdot \beta t / Z| = 0.068$ $(d45T - d45N)/(IM \cdot Z) = 0.031$ $Mt = 0.089$ $|\beta t / \sqrt{Z}| = 0.63$ $\omega 1o / \omega 1p = 2.09$ $r11/r12 = -0.13$ $r21/r22 = 0.36$ As becomes clear from the aberration charts in FIGS. 2A to 2E, FIGS. 3A to 3E and FIGS. 4A to 4E, the zoom lens of Example 1 has a sufficient aberration correction capability for realizing a high resolution.

EXAMPLE 2

Table 4 shows a numerical example of a zoom lens according to Example 2, and the aspherical coefficients for this case are listed in Table 5. Moreover, for the air intervals that are variable by zooming, Table 6 lists values for when the object point is at infinity.

TABLE 4

| unit | surface | r | d | n | ν |
|---|---|---|---|---|---|
| 1 | 1 | −325.774 | 2.50 | 1.84665 | 23.8 |
|  | 2 | 68.993 | 7.85 | 1.49699 | 81.6 |
|  | 3 | −149.075 | 0.20 |  |  |
|  | 4 | 91.846 | 4.70 | 1.80600 | 40.7 |
|  | 5 | −715.534 | 0.20 |  |  |
|  | 6 | 41.916 | 5.30 | 1.83499 | 42.7 |
|  | 7 | 109.233 | var. |  |  |
| 2 | 8 | 109.233 | 1.00 | 1.83499 | 42.7 |
|  | 9 | 9.832 | 6.00 |  |  |
|  | 10 | −22.690 | 1.35 | 1.60602 | 57.4 |
|  | 11 | 22.690 | 1.35 |  |  |
|  | 12 | 25.818 | 3.60 | 1.84665 | 23.8 |
|  | 13 | −25.818 | 1.00 | 1.83401 | 37.2 |
|  | 14 | ∞ | var. |  |  |
| aperture stop | 15 | — | 2.50 | — | — |
| 3 | 16 | 24.702 | 3.00 | 1.51450 | 63.1 |
|  | 17 | −24.702 | 0.80 |  |  |
|  | 18 | ∞ | 1.05 | 1.80518 | 25.4 |
|  | 19 | 60.000 | 3.50 |  |  |
| 4 | 20 | −23.127 | 1.00 | 1.69680 | 55.6 |
|  | 21 | 23.127 | 1.80 | 1.84665 | 23.8 |
|  | 22 | ∞ | var. |  |  |
| 5 | 23 | 28.398 | 3.00 | 1.48749 | 70.4 |
|  | 24 | −28.398 | 1.00 | 1.84665 | 23.8 |
|  | 25 | 54.750 | 1.00 |  |  |
|  | 26 | 14.961 | 4.50 | 1.51450 | 63.1 |
|  | 27 | −14.961 | var. |  |  |
| 6 | 28 | ∞ | 20.00 | 1.58913 | 61.2 |
|  | 29 | ∞ | 3.00 | 1.51633 | 64.1 |
|  | 30 | ∞ | — |  |  |

TABLE 5

| surface | K | D | E | F |
|---|---|---|---|---|
| 10 | 1.19362E+00 | 3.38265E−05 | 1.29210E−07 | −5.83703E−10 |
| 11 | 1.19362E+00 | −3.38265E−05 | −1.29210E−07 | 5.83703E−10 |
| 16 | −1.32081E−01 | −1.36623E−05 | −1.84002E−08 | 0.00000E+00 |
| 17 | −1.32081E−01 | 1.36623E−05 | 1.84002E−08 | 0.00000E+00 |
| 26 | −1.40836E+00 | −3.04113E−05 | 8.76971E−08 | 0.00000E+00 |
| 27 | −1.40836E+00 | 3.04113E−05 | −8.76971E−08 | 0.00000E+00 |

TABLE 6

|  | wide angle | standard | telephoto |
|---|---|---|---|
| f | 4.628 | 24.756 | 36.874 |
| F/NO | 1.656 | 2.453 | 2.823 |
| 2ω | 69.424 | 13.694 | 9.220 |
| d7 | 1.000 | 27.800 | 31.500 |
| d14 | 35.000 | 8.200 | 4.500 |
| d22 | 12.400 | 9.141 | 9.667 |
| d27 | 2.000 | 5.259 | 5.259 |

FIGS. 5A to 5E respectively show aberration charts for the wide-angle end of the zoom lens based on the data in Table 4. FIGS. 6A to 6E show aberration charts for the standard position. FIGS. 7A to 7E show aberration charts for the telephoto end.

The values corresponding to the afore-mentioned conditional expressions (1) to (6) are as follows:

$|\beta w \cdot \beta t/Z| = 0.054$ $(d45T - d45N)/(IM \cdot Z) = 0.011$ $Mt = 0.034$ $|\beta t/\sqrt{Z}| = 0.56$ $\omega 1o/\omega 1p = 2.13$ $r11/r12 = -0.13$ $r21/r22 = 0.38$ As becomes clear from the aberration charts in FIGS. 5A to 5E, FIGS. 6A to 6E and FIGS. 7A to 7E, the zoom lens of Example 2 has a sufficient aberration correction capability for realizing a high resolution.

EXAMPLE 3

Table 7 shows a numerical example of a zoom lens according to Example 3, and the aspherical coefficients for this case are listed in Table 8. Moreover, for the air intervals that are variable by zooming, Table 9 lists values for when the object point is at infinity.

TABLE 7

| unit | surface | r | d | n | ν |
|---|---|---|---|---|---|
| 1 | 1 | 350.000 | 2.50 | 1.84665 | 23.8 |
|  | 2 | 49.958 | 7.75 | 1.49699 | 81.6 |
|  | 3 | ∞ | 0.20 |  |  |
|  | 4 | 71.366 | 4.90 | 1.80600 | 40.7 |
|  | 5 | 700.000 | 0.20 |  |  |
|  | 6 | 44.149 | 5.30 | 1.83499 | 42.7 |
|  | 7 | 135.024 | var. |  |  |

TABLE 7-continued

| unit | surface | r | d | n | ν |
|---|---|---|---|---|---|
| 2 | 8 | 135.024 | 1.00 | 1.83499 | 42.7 |
|  | 9 | 10.141 | 6.00 |  |  |
|  | 10 | −21.351 | 1.35 | 1.60602 | 57.4 |
|  | 11 | 21.351 | 1.35 |  |  |
|  | 12 | 26.142 | 3.60 | 1.84665 | 23.8 |
|  | 13 | −26.142 | 1.00 | 1.83401 | 37.2 |
|  | 14 | ∞ | var. |  |  |
| aperture stop | 15 | — | 2.50 | — | — |
| 3 | 16 | 24.306 | 3.00 | 1.51450 | 63.1 |
|  | 17 | −24.306 | 0.80 |  |  |
|  | 18 | ∞ | 1.05 | 1.80518 | 25.4 |
|  | 19 | 60.000 | 3.50 |  |  |
| 4 | 20 | −23.088 | 1.00 | 1.69680 | 55.6 |
|  | 21 | 23.088 | 1.80 | 1.84665 | 23.8 |
|  | 22 | ∞ | var. |  |  |
| 5 | 23 | 28.185 | 3.00 | 1.49699 | 81.6 |
|  | 24 | −28.185 | 1.00 | 1.84665 | 23.8 |
|  | 25 | 55.157 | 1.00 |  |  |
|  | 26 | 15.058 | 4.50 | 1.60602 | 57.4 |
|  | 27 | −15.058 | var. |  |  |
| 6 | 28 | ∞ | 20.00 | 1.58913 | 61.2 |
|  | 29 | ∞ | 3.00 | 1.51633 | 64.1 |
|  | 30 | ∞ | — |  |  |

TABLE 8

| surface | K | D | E | F |
|---|---|---|---|---|
| 10 | 1.83153E−01 | 2.40673E−05 | 6.75939E−08 | −8.81965E−10 |
| 11 | 1.83153E−01 | −2.40673E−05 | −6.75939E−08 | 8.81965E−10 |
| 16 | −1.81885E−01 | −1.41053E−05 | −1.37944E−08 | 0.00000E+00 |
| 17 | −1.81885E−01 | 1.41053E−05 | 1.37944E−08 | 0.00000E+00 |
| 23 | −1.39166E+00 | −3.03277E−05 | 8.13292E−08 | 0.00000E+00 |
| 24 | −1.39166E+00 | 3.03277E−05 | −8.13292E−08 | 0.00000E+00 |

TABLE 9

|  | wide angle | standard | telephoto |
|---|---|---|---|
| f | 4.641 | 26.534 | 58.328 |
| F/NO | 1.667 | 2.479 | 2.858 |
| 2ω | 69.324 | 12.830 | 5.808 |
| d7 | 1.000 | 28.134 | 34.500 |
| d14 | 35.000 | 7.866 | 1.500 |
| d22 | 12.400 | 8.787 | 11.345 |
| d27 | 2.000 | 5.613 | 3.055 |

FIGS. 8A to 8E respectively show aberration charts for the wide-angle end of the zoom lens based on the data in Table 7. FIGS. 9A to 9E show aberration charts for the standard position. FIGS. 10A to 10E show aberration charts for the telephoto end.

The values corresponding to the afore-mentioned conditional expressions (1) to (6) are as follows:

$|\beta w \cdot \beta t/Z| = 0.061$ $(d45T - d45N)/(IM \cdot Z) = 0.034$ $Mt = 1.037$ $|\beta t/\sqrt{Z}|=0.82$ $\omega 1o/\omega 1p=1.80$ $r11/r12=-0.10$ $r21/r22=0.33$ As becomes clear from the aberration charts in FIGS. 8A to 8E, FIGS. 9A to 9E and FIGS. 10A to 10E, the zoom lens of Example 3 has a sufficient aberration correction capability for realizing a high resolution.

EXAMPLE 4

Table 10 shows a numerical example of a zoom lens according to Example 4, and the aspherical coefficients for this case are listed in Table 11. Moreover, for the air intervals that are variable by zooming, Table 12 lists values for when the object point is at infinity.

TABLE 10

| unit | surface | r | d | n | v |
|---|---|---|---|---|---|
| 1 | 1 | 350.000 | 2.50 | 1.84665 | 23.8 |
|   | 2 | 49.119 | 7.75 | 1.49699 | 81.6 |
|   | 3 | ∞ | 0.20 |   |   |
|   | 4 | 70.535 | 4.90 | 1.80600 | 40.7 |
|   | 5 | 700.000 | 0.20 |   |   |
|   | 6 | 44.110 | 5.30 | 1.83499 | 42.7 |
|   | 7 | 136.975 | var. |   |   |
| 2 | 8 | 136.975 | 1.00 | 1.83499 | 42.7 |
|   | 9 | 10.146 | 6.00 |   |   |
|   | 10 | −20.618 | 1.35 | 1.60602 | 57.4 |
|   | 11 | 20.618 | 1.35 |   |   |
|   | 12 | 26.469 | 3.60 | 1.84665 | 23.8 |
|   | 13 | −26.469 | 1.00 | 1.83401 | 37.2 |
|   | 14 | ∞ | var. |   |   |
| aperture stop | 15 | — | 2.50 | — | — |
| 3 | 16 | 22.941 | 3.00 | 1.51450 | 63.1 |
|   | 17 | −22.941 | 0.80 |   |   |
|   | 18 | ∞ | 1.05 | 1.80518 | 25.4 |
|   | 19 | 60.000 | 3.50 |   |   |
| 4 | 20 | −21.883 | 1.00 | 1.69680 | 55.6 |
|   | 21 | 21.883 | 1.80 | 1.84665 | 23.8 |
|   | 22 | ∞ | var. |   |   |
| 5 | 23 | 27.698 | 3.00 | 1.48749 | 70.4 |
|   | 24 | −27.698 | 1.00 | 1.84665 | 23.8 |
|   | 25 | 47.760 | 1.00 |   |   |
|   | 26 | 14.720 | 4.50 | 1.51450 | 63.1 |
|   | 27 | −14.720 | var. |   |   |
| 6 | 28 | ∞ | 20.00 | 1.58913 | 61.2 |
|   | 29 | ∞ | 3.00 | 1.51633 | 64.1 |
|   | 30 | ∞ | — |   |   |

TABLE 11

| surface | K | D | E | F |
|---|---|---|---|---|
| 10 | 2.22626E−01 | 2.85535E−05 | 7.24352E−09 | −2.88411E−10 |
| 11 | 2.22626E−01 | −2.85535E−05 | −7.24352E−09 | 2.88411E−10 |
| 16 | −2.40678E−01 | −1.50534E−05 | −1.36330E−08 | 0.00000E+00 |
| 17 | −2.40678E−01 | 1.50534E−05 | 1.36330E−08 | 0.00000E+00 |
| 26 | −1.40484E+00 | −3.05492E−05 | 8.59011E−08 | 0.00000E+00 |
| 27 | −1.40484E+00 | 3.05492E−05 | −8.59011E−08 | 0.00000E+00 |

TABLE 12

|   | wide angle | standard | telephoto |
|---|---|---|---|
| f | 4.629 | 27.810 | 33.312 |
| F/NO | 1.676 | 2.538 | 2.923 |
| 2ω | 69.438 | 12.238 | 10.232 |
| d7 | 1.000 | 28.370 | 30.000 |
| d14 | 35.000 | 7.630 | 6.000 |
| d22 | 12.400 | 8.411 | 8.522 |
| d27 | 2.000 | 5.989 | 5.878 |

FIGS. 11A to 11E respectively show aberration charts for the wide-angle end of the zoom lens based on the data in Table 10. FIGS. 12A to 12E show aberration charts for the standard position. FIGS. 13A to 13E show aberration charts for the telephoto end.

The values corresponding to the afore-mentioned conditional expressions (1) to (6) are as follows:

$|\beta w \cdot \beta t/Z|=0.043$ $(d45T-d45N)/(IM \cdot Z)=0.003$ $Mt=0.014$ $|\beta t/\sqrt{Z}|=0.45$ $\omega 1o/\omega 1p=1.80$ $r11/r12=0.100$ $r21/r22=0.32$ As becomes clear from the aberration charts in FIGS. 11A to 11E, FIGS. 12A to 12E and FIGS. 13A to 13E, the zoom lens of Example 4 has a sufficient aberration correction capability for realizing a high resolution.

EXAMPLE 5

Table 13 shows a numerical example of a zoom lens according to Example 5, and the aspherical coefficients for this case are listed in Table 14. Moreover, for the air intervals that are variable by zooming, Table 15 lists values for when the object point is at infinity.

TABLE 13

| unit | surface | r | d | n | v |
|---|---|---|---|---|---|
| 1 | 1 | 350.000 | 2.50 | 1.84665 | 23.8 |
|   | 2 | 50.297 | 7.75 | 1.49699 | 81.6 |
|   | 3 | ∞ | 0.20 |   |   |
|   | 4 | 71.090 | 4.90 | 1.80600 | 40.7 |

TABLE 13-continued

| unit | surface | r | d | n | v |
|---|---|---|---|---|---|
|  | 5 | 700.000 | 0.20 |  |  |
|  | 6 | 44.207 | 5.30 | 1.83499 | 42.7 |
|  | 7 | 132.372 | var. |  |  |
| 2 | 8 | 132.372 | 1.00 | 1.83499 | 42.7 |
|  | 9 | 10.133 | 6.00 |  |  |
|  | 10 | −21.153 | 1.35 | 1.60602 | 57.4 |
|  | 11 | 21.153 | 1.35 |  |  |
|  | 12 | 26.017 | 3.60 | 1.84665 | 23.8 |
|  | 13 | −26.017 | 1.00 | 1.83401 | 37.2 |
|  | 14 | ∞ | var. |  |  |
| aperture stop 3 | 15 | — | 2.50 | — | — |
|  | 16 | 24.174 | 3.00 | 1.51450 | 63.1 |
|  | 17 | −24.174 | 0.80 |  |  |
|  | 18 | ∞ | 1.05 | 1.80518 | 25.4 |
|  | 19 | 60.000 | 3.50 |  |  |
| 4 | 20 | −22.996 | 1.00 | 1.69680 | 55.6 |
|  | 21 | 22.996 | 1.80 | 1.84665 | 23.8 |
|  | 22 | ∞ | var. |  |  |
| 5 | 23 | 28.183 | 3.00 | 1.48749 | 70.4 |
|  | 24 | −28.183 | 1.00 | 1.84665 | 23.8 |
|  | 25 | 54.088 | 1.00 |  |  |
|  | 26 | 14.980 | 4.50 | 1.51450 | 63.1 |
|  | 27 | −14.980 | var. |  |  |
| 6 | 28 | ∞ | 20.00 | 1.58913 | 61.2 |
|  | 29 | ∞ | 3.00 | 1.51633 | 64.1 |
|  | 30 | ∞ | — |  |  |

TABLE 14

| surface | K | D | E | F |
|---|---|---|---|---|
| 10 | 1.07025E−01 | 2.40793E−05 | 5.26515E−08 | −8.58714E−10 |
| 11 | 1.07025E−01 | −2.40793E−05 | −5.26515E−08 | 8.58714E−10 |
| 16 | −2.13280E−01 | −1.44295E−05 | −3.80519E−09 | 0.00000E+00 |
| 17 | −2.13280E−01 | 1.44295E−05 | 3.80519E−09 | 0.00000E+00 |
| 26 | −1.39591E+00 | −3.04450E−05 | 8.31026E−08 | 0.00000E+00 |
| 27 | −1.39591E+00 | 3.04450E−05 | −8.31026E−08 | 0.00000E+00 |

TABLE 15

|  | wide angle | standard | telephoto |
|---|---|---|---|
| f | 4.625 | 32.951 | 45.035 |
| F/NO | 1.664 | 2.473 | 2.838 |
| 2ω | 69.472 | 12.728 | 7.560 |
| d7 | 1.000 | 28.305 | 32.800 |
| d14 | 35.000 | 7.695 | 3.200 |
| d22 | 12.400 | 8.778 | 9.803 |
| d27 | 2.000 | 5.622 | 4.597 |

FIGS. 14A to 14E respectively show aberration charts for the wide-angle end of the zoom lens based on the data in Table 13. FIGS. 15A to 15E show aberration charts for the standard position. FIGS. 16A to 16E show aberration charts for the telephoto end.

The values corresponding to the afore-mentioned conditional expressions (1) to (6) are as follows:

$|\beta w \cdot \beta t/Z|=0.05$ $(d45T-d45N)/(IM \cdot Z)=0.018$ $Mt=0.057$ $|\beta t\sqrt{}/Z|=0.60$ $\omega 1o/\omega 1p=1.80$ $r11/r12=0.10$ $r21/r22=0.33$ As becomes clear from the aberration charts in FIGS. 14A to 14E, FIGS. 15A to 15E and FIGS. 16A to 16E, the zoom lens of Example 5 has a sufficient aberration correction capability for realizing a high resolution.

Figure 17:
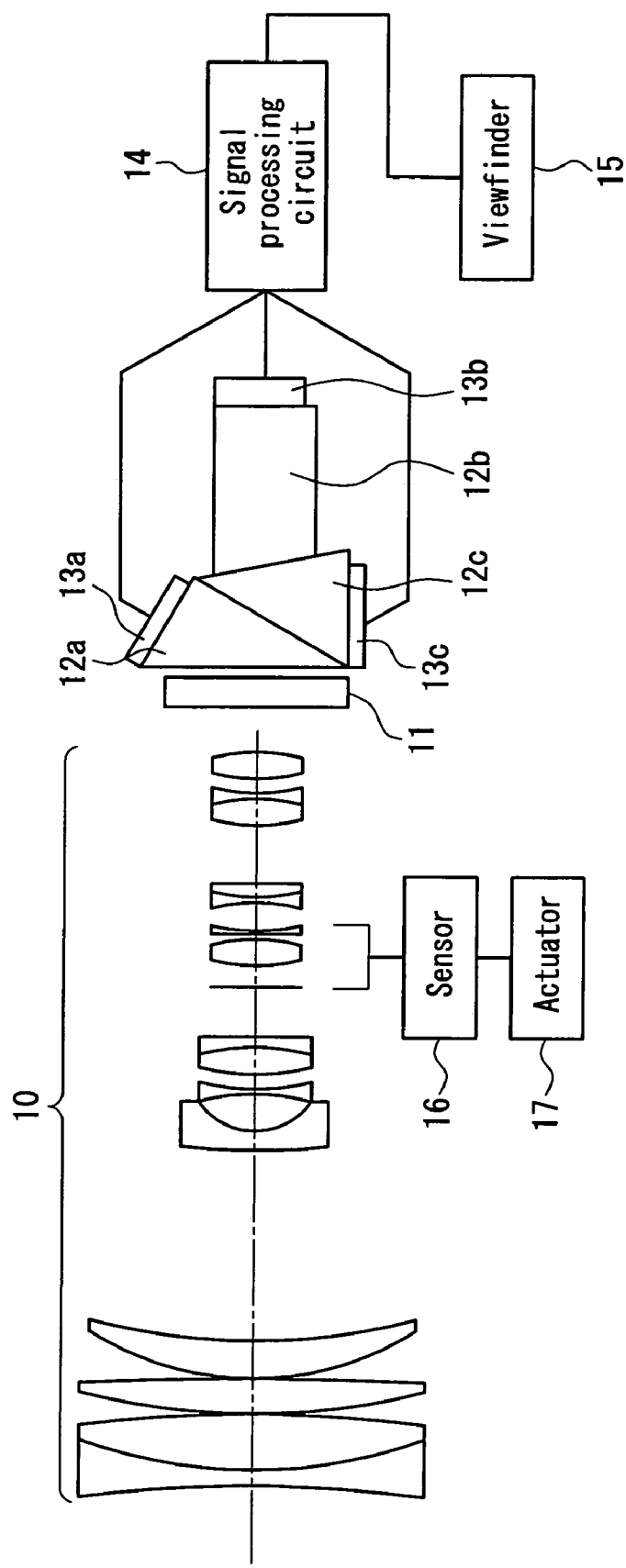
FIG. 17 is a side view showing the configuration of a video camera using a zoom lens according to the present invention.

FIG. 17 shows the configuration of a 3-CCD video camera using a zoom lens having a function for image stabilization according to the above-described embodiment. In this figure, numeral 10 denotes the zoom lens of Example 1. Numeral 11 denotes a low-pass filter, and numerals 12a to 12c denote color separation prisms. Image pickup elements 13a to 13c are disposed on the rear side of the color separation prisms 12a to 12c, respectively. The output of the image pickup elements 13a to 13c is input into a signal processing circuit 14. The output of the signal processing circuit 14 is input into a viewfinder 15. Furthermore, a sensor 16 for sensing image shake is provided, and the lenses are driven by an actuator 17 on the basis of the output of this sensor 16.

Thus, by using this zoom lens 10 according to an embodiment of the present invention, it is possible to provide a high-performance video camera with image stabilization.

It should be noted that, even though this is not shown in the figures, it is also possible to use the zoom lenses according to Examples 2 to 5 instead of the zoom lens according to Example 1 shown in FIG. 1.

Moreover, in the Examples of the present invention, the image stabilization is performed by shifting a lens unit having a positive refractive power, but a similar effect also can be attained by shifting a lens unit having a negative refractive power.

INDUSTRIAL APPLICABILITY

With the present invention, it is possible to provide a high-image-quality, high-magnification-ratio 3-CCD zoom lens with a function for image stabilization by shifting the third lens unit.

The invention claimed is:

1. A zoom lens comprising, in the following order from an object side:
    a first lens unit that has a positive refractive power as a whole and that is fixed with respect to an image plane;
    a second lens unit that has a negative refractive power as a whole and that causes a variable power action when moved along an optical axis;
    an aperture stop that is fixed with respect to the image plane;
    a third lens unit that has a positive refractive power as a whole and that is fixed with respect to the optical axis direction when zooming and when focusing;

a fourth lens unit that has a negative refractive power as a whole and that is fixed with respect to the image plane; and a fifth lens unit that has a positive refractive power as a whole and that is movable along the optical axis such that the image plane, which is displaced by a movement of the second lens unit along the optical axis and by a movement of the object, is maintained at a constant position from a reference plane, wherein the entire third lens unit is movable in a direction perpendicular to the optical axis in order to stabilize an image, the fifth lens unit is moved to the object side as the object point approaches, and the following conditional expressions (1) and (2) are satisfied $$0.035 < |\beta w \cdot \beta t/Z| < 0.075 \quad (1)$$

βw: magnification ratio of the second lens unit at the wide-angle end

βt: magnification ratio of the second lens unit at the telephoto end

Z: zoom ratio $$0 < (d45T - d45N)/(IM \cdot Z) < 0.04 \quad (2)$$

d45T: interval between the fourth lens unit and the fifth lens unit in a telephoto position d45N: interval between the fourth lens unit and the fifth lens unit when the second lens unit is in an equal magnification position IM: image size Z: zoom ratio.

2. The zoom lens according to claim 1, wherein the fourth lens unit satisfies the following condition when the second lens unit is at an equal magnification position or at the telephoto end $$Mt \leq 0.089 \quad (3)$$

Mt: amount by which the fourth lens unit is moved when the second lens unit is moved by 0.1 mm in a telephoto position.

3. The zoom lens according to claim 1, wherein the second lens unit satisfies the following condition $$0.4 \leq |\beta t/\sqrt{Z}| \leq 0.65 \quad (4).$$

4. The zoom lens according to claim 1, wherein the first lens unit is made of four lenses including, arranged in the following order from an object side, a lens with negative refractive power, a lens with positive refractive power, a lens with positive refractive power, and a lens with positive refractive power.

5. The zoom lens according to claim 1, wherein the second lens unit comprises at least three concave lenses and one convex lens and at least one aspherical surface.

6. The zoom lens according to claim 1, wherein the third lens unit comprises at least one convex lens and one concave lens and at least one aspherical surface.

7. The zoom lens according to claim 1, wherein the fourth lens unit comprises at least one convex lens and one concave lens and at least one aspherical surface.

8. The zoom lens according to claim 1, wherein the fifth lens unit comprises at least two convex lenses and at least one concave lens.

9. The zoom lens according to 1, wherein the second to fifth lens units comprise at least one lens having the same sag amount on both sides.

10. The zoom lens according to claim 1, comprising at least one aspherical surface whose sag amount on both sides is the same.

11. The zoom lens according to claim 1, wherein all of the aspherical surfaces are such that the sag amount on both sides is the same.

12. A video camera comprising a zoom lens according to claim 1, and an image-pickup element for photoelectrically converting light that has passed through the zoom lens.

* * * * *